United States Patent
Leong et al.

(10) Patent No.: US 10,607,277 B2
(45) Date of Patent: Mar. 31, 2020

(54) AUTOMATED PRODUCT PERSONALIZATION BASED ON MULITPLE SOURCES OF PRODUCT INFORMATION

(71) Applicant: International Business Machines Corporation, Armonk, NY (US)

(72) Inventors: Alan M. E. Leong, North York (CA); Shaun N. Maharaj, Scarborough (CA); Parnit Pooni, Mississauge (CA); Chi Kam P. Yau, Markham (CA)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 15/050,515

(22) Filed: Feb. 23, 2016

(65) Prior Publication Data
US 2017/0243281 A1    Aug. 24, 2017

(51) Int. Cl.
*G06Q 30/00* (2012.01)
*G06Q 30/06* (2012.01)
(Continued)

(52) U.S. Cl.
CPC ..... *G06Q 30/0643* (2013.01); *G06F 16/3344* (2019.01); *G06F 16/35* (2019.01)

(58) Field of Classification Search
CPC .... G06Q 30/0643; G06Q 30/02; G06Q 10/00; G06Q 10/08; G06Q 30/00; G06Q 10/10;
(Continued)

(56) References Cited

U.S. PATENT DOCUMENTS 7,870,039 B1    1/2011 Dom et al.
8,799,094 B2    8/2014 Schmidt et al.
(Continued)

OTHER PUBLICATIONS

Takahashi, D. (Oct. 11, 2013). How IBM's Michelle Zhou figured out my personality from 200 tweets (interview). Retrieved from https://venturebeat.com/2013/10/11/how-ibms-michelle-zhou-figured-out-my-personality-from-200-tweets-interview/view-all/ (Year: 2013) (Year: 2013).*

(Continued)

*Primary Examiner* — Abby J Flynn
(74) *Attorney, Agent, or Firm* — Joseph P. Curcuru; Gilbert Harmon, Jr.

(57) ABSTRACT

In an approach to customer-product matching, a computing device receives textual information related to a product. The computing device generates a set of product personality traits based on analyzing the textual information by a natural language processor. The computing device identifies a set of customer personality traits for a target customer group. The computing device determines whether a degree of correlation between a first trait from the set of product personality traits and a second trait from the set of customer personality traits meets or exceeds a predetermined threshold value. Responsive to determining that the degree of correlation does not meet or exceed a predetermined threshold value, the computing device revises the textual information based on a psycholinguistic dictionary. The computing device continues to revise the set of product personality traits until the degree of correlation meets or exceeds the predetermined threshold value.

20 Claims, 4 Drawing Sheets

(51) Int. Cl.
*G06F 16/35* (2019.01)
*G06F 16/33* (2019.01)

(58) Field of Classification Search
CPC ...... G06F 16/35; G06F 16/3344; G06F 17/28; G06F 17/30; G06F 17/21; G06F 17/00; G06F 17/24; G06F 17/27; H04M 3/51; H04H 60/46; A63F 13/58
See application file for complete search history.

(56) References Cited

U.S. PATENT DOCUMENTS

| | | | |
|---|---|---|---|
| 2002/0004790 A1* | 1/2002 | Yamanishi | G06F 17/2715 706/12 |
| 2008/0114807 A1 | 5/2008 | Sembower | |
| 2008/0133488 A1* | 6/2008 | Bandaru | G06F 17/2785 |
| 2008/0243593 A1* | 10/2008 | Ko | G06Q 30/02 705/7.33 |
| 2009/0248510 A1* | 10/2009 | Ahluwalia | G06Q 10/10 705/14.54 |
| 2009/0271293 A1 | 10/2009 | Parkhurst et al. | |
| 2010/0094701 A1* | 4/2010 | Ghosh | G06Q 30/00 705/14.36 |
| 2012/0215783 A1 | 8/2012 | Musgrove et al. | |
| 2012/0259620 A1* | 10/2012 | Vratskides | G06Q 30/02 704/9 |
| 2013/0041837 A1* | 2/2013 | Dempski | G06Q 10/101 705/345 |
| 2013/0268395 A1 | 10/2013 | Sandow | |
| 2013/0325652 A1 | 12/2013 | Ouimet | |
| 2013/0339849 A1* | 12/2013 | Mebed | G06Q 10/107 715/273 |
| 2014/0172652 A1 | 6/2014 | Pobbathi et al. | |
| 2014/0257990 A1 | 9/2014 | Cudgma et al. | |
| 2014/0337009 A1* | 11/2014 | Kau | G06F 17/274 704/9 |
| 2015/0066711 A1 | 3/2015 | Chua et al. | |
| 2015/0154682 A1* | 6/2015 | Ram | G06Q 30/0625 705/26.62 |
| 2016/0005056 A1* | 1/2016 | Gunjan | G06Q 30/0202 705/7.31 |
| 2016/0062969 A1* | 3/2016 | Mengle | G06F 17/274 704/9 |
| 2016/0117740 A1* | 4/2016 | Linden | G06Q 30/0277 705/14.66 |
| 2016/0292705 A1* | 10/2016 | Ayzenshtat | G06Q 30/0204 |

OTHER PUBLICATIONS

Nguyen, T., Phung, D., Adams, B., & Venkatesh, S. (2014). Mood sensing from social media texts and its applications. Knowledge and Information Systems, 39(3), 667-702. doi:http://dx.doi.org/10.1007/s10115-013-0628-8 (Year: 2014).*

Leon et al., "Automated Product Personalization Based on Multiple Sources of Product Information", U.S. Appl. No. 15/1579317, filed Oct. 27, 2017, 27 pages.

IBM, Appendix P, list of patents or patent applications treated as related, filed herewith, 2 pages.

Jahng et al., "Personality traits and effectiveness of presentation of product information in e-business systems", European Journal of Information Systems—Abstract of article, (2002) 11, 181-195; doi:10.1057/palgrave.ejis.3000431, <http://www.palgrave-journals.com/ejis/journal/v11/n3/abs/3000431a.html>, 1 page.

Ketkar, Nikhil, "Building a Comprehensive Database of Products: Open Problems and Challenges in Machine Learning", ix.™, Aug. 29, 2014, © 2015 Indix Corporation, 6 pages.

"Getting started with the Message Resonance service", IBM Watson Developer Cloud, <https://www.ibm.com/smarterplanet/us/en/ibmwatson/developercloud/doc/mrapi/>, printed Dec. 14, 2015, 2 pages.

* cited by examiner

AUTOMATED PRODUCT PERSONALIZATION BASED ON MULITPLE SOURCES OF PRODUCT INFORMATION

TECHNICAL FIELD OF THE INVENTION

The present disclosure relates generally to the field of natural language processing, and more particularly to product-customer matching based on using natural language processing to generate a product personality profile.

BACKGROUND OF THE INVENTION

Product personalization, such as in the context of targeted product promotion in a retail setting, can be a manual process whereby a catalog manager creates one or more sales (product) categories to which one or more customer segments can be assigned. The sales manager can assign a customer segment to a sales category with the goal of designing a product promotion that will appeal to that segment based on ideals or characteristics associated with the segment.

Natural language processing is a field of artificial intelligence that is concerned with the understanding and/or generation of human language, such as but not limited to human-readable text, by computers. Natural language processing typically employs machine learning algorithms to perform various tasks, such as but without limitation parsing of textual information (e.g., breaking a string of words into constituent pieces for an analytical purpose). Natural language processing can be used to associate ideals and characteristics with textual information.

SUMMARY

Embodiments of the present invention disclose a computer-implemented method, a computer program product, and a computer system for automated product personalization based on product personality. A computing device receives textual information related to a product. The computing device generates a set of product personality traits based on analyzing the textual information by a natural language processor. The computing device identifies a set of customer personality traits for a target customer group. The computing device determines a degree of correlation between a first trait from the set of product personality traits and a second trait from the set of customer personality traits. The computing device determines whether the degree of correlation meets or exceeds a predetermined threshold value. The computing device revises, responsive to determining that the degree of correlation does not meet or exceed the predetermined threshold value, the textual information based on a psycholinguistic dictionary. The computing device repeats, until the degree of correlation meets or exceeds the predetermined threshold value, the revising step.

DETAILED DESCRIPTION

Current approaches to product personalization can be time-consuming, e.g., in the case of manual creation of sales categories and assignment of customers to those categories, and the resulting assignments can be sub-optimal if not validated. Embodiments disclosed herein propose a product-personality-based approach that can increase the strength of product-customer matching (and thus, e.g., assist in the tailoring of targeted product descriptions) based on repeatedly evaluating and updating a product personality profile.

Figure 1:
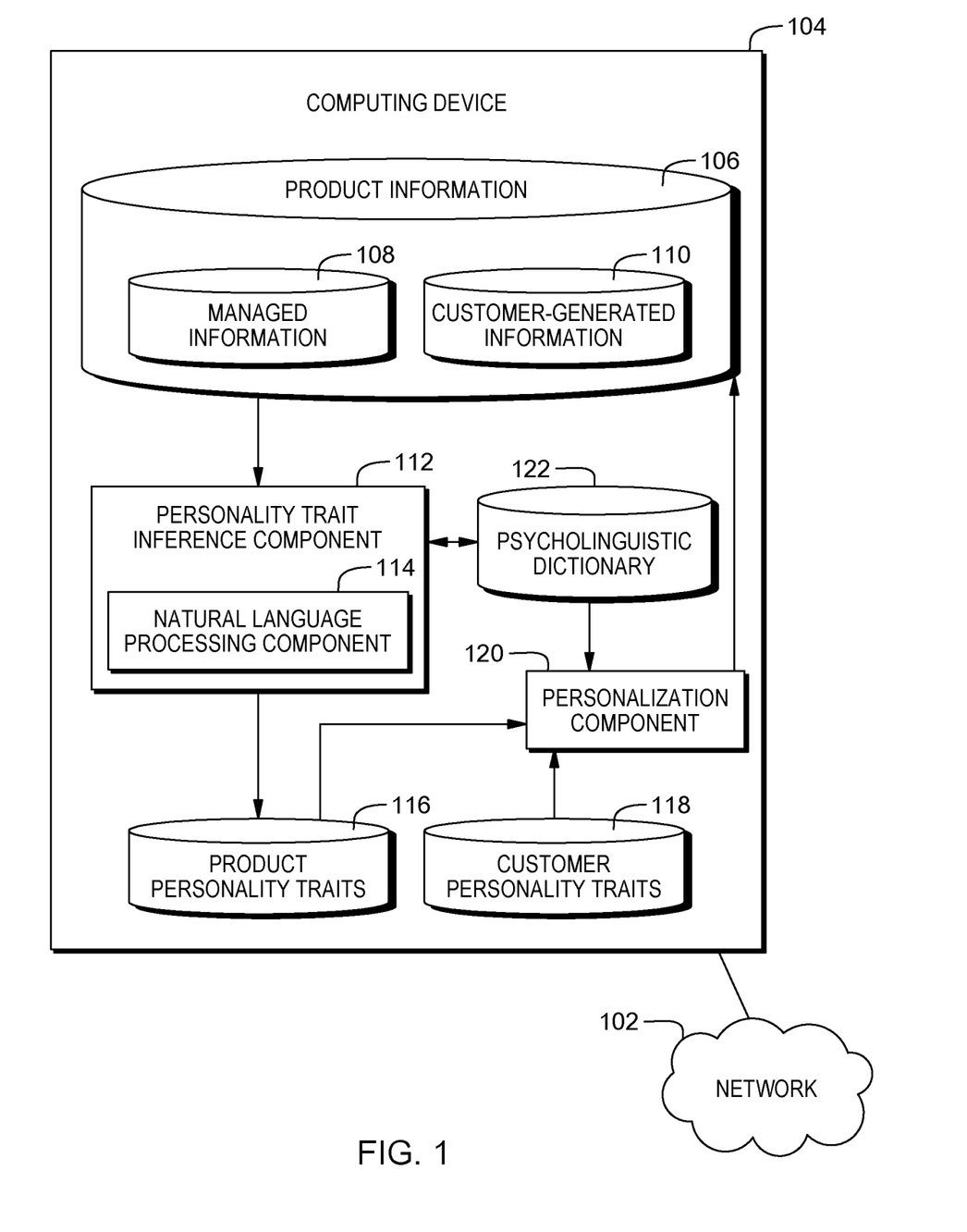
FIG. 1 is a block diagram of an exemplary computing environment, in accordance with an embodiment of the present invention.

Embodiments of the present invention are described herein with reference to the Figures. FIG. 1 shows a block diagram of a computing environment 100, in accordance with an embodiment of the present invention. FIG. 1 is provided for the purposes of illustration and does not imply any limitations with regard to the environments in which different embodiments can be implemented. Many modifications to the depicted environment can be made by those skilled in the art without departing from the scope of the invention as recited in the claims.

Computing environment 100 includes computing device 104, which can be interconnected with other devices (not shown) over network 102. Network 102 can be, for example, a telecommunications network, a local area network (LAN), a wide area network (WAN), such as the Internet, or a combination of these, and can include wired, wireless, or fiber optic connections. In general, network 102 can be any combination of connections and protocols that will support communications between computing device 104 and other computing devices (not shown) within computing environment 100.

Computing device 104 can be any programmable electronic device capable of executing machine-readable instructions and communicating with other devices over network 102, in accordance with an embodiment of the present invention. Computing device 104 includes product information 106, personality trait inference component 112, product personality traits 116, customer personality traits 118, personalization component 120, and psycholinguistic dictionary 122. Computing device 104 can include internal and external hardware components, as depicted and described in further detail with reference to FIG. 4.

Product information 106 is textual information that can be received by a natural language processor (NLP) for the purpose of producing a set of product personality traits (also referred to as "traits" or a "product personality profile," e.g., product personality traits 116, described herein). Product information 106 can include managed information 108 and customer-generated information 110.

Managed information 108 comprises information provided by a user. Managed information 108 can be, for example but without limitation, a product description written by a catalog manager in human-readable text, product attribute information, a product name, a catalog hierarchy, and a product category description. Personalization component 120 can revise managed information 108 based on psycholinguistic dictionary 122, as described herein.

Customer-generated information 110 comprises information derived from customer-generated content. Customer-generated information 110 can be, for example but without limitation, product purchase history information, including information about customers who have previously viewed and/or purchased the product; and product reviews, customer comments, and other customer-generated content describing the product.

Personality trait inference component 112 can be based on any NLP with the ability to receive textual information, i.e., product information 106, and produce product personality traits 116, in accordance with an embodiment of the present invention. Personality trait inference component 112 includes natural language processing component 114, which can be, for example but without limitation, based on Watson Personality Insights by International Business Machines Corporation (IBM).

In an exemplary embodiment, personality trait inference component 112 can receive product information 106 pursuant to separate requests made to one or more data sources. For example, personality trait inference component 112 can make a first request for a product description, a second request for product attributes, and a third request for product reviews.

In an exemplary embodiment, personality trait inference component 112 can produce product personality traits 116 by tokenizing product information 106 to produce a set of keywords and determining a set of personality traits 116 based on matching the keywords with traits in psycholinguistic dictionary 122 (described herein) by, for example but without limitation, a weighted combination approach. Tokenization is a natural language processing technique well-known to those skilled in the art that produces a set of semantic elements based on textual input. The weighted combination approach comprises computing one or more traits based on word counts in one or more Linguistic Word Count (LIWC) categories correlated with the trait(s), e.g., based on a set of weights or correlation coefficients established through research, such as in the work of Yarkoni. For example, personality trait inference component 112 can parse product information 106 into LIWC categories, determine a word count for each category, and determine a product using appropriate correlation coefficients for respective traits. In the same example, personality trait inference component 112 can compute a dot product of a vector containing word counts for LIWC categories and a vector containing the appropriate correlation coefficients.

In an exemplary embodiment, personality trait inference component 112 can take a set of percentage scores determined pursuant to separate requests for product information 106 (e.g., a first request for a product description, a second request for product attributes, and a third request for product reviews) and compute an average, i.e., arithmetic mean, for each trait in order to produce one set of percentage scores per trait in product personality traits 116.

Product personality traits 116 comprise one or more personality traits associated with a product. Product personality traits 116 can be, for example but without limitation, traits according to the Big Five (or "five factor") model (wherein Openness, Conscientiousness, Extraversion, Agreeableness, and Emotional Range/Neuroticism, are Big Five personality traits), a Needs model (e.g., wherein Stability is a Need) based on the work of Kotler and Ford, and/or a Values model (e.g., wherein Self-Transcendence is a Value) based on the work of Schwartz. In an exemplary embodiment, product personality traits 116 can comprise percentage scores and sub-scores for traits according to the Big Five model. For example, product personality traits 116 can comprise a 90% score for Conscientiousness and various sub-scores for Achievement Striving, Cautiousness, Dutifulness, Orderliness, Self-Discipline, and Self-Efficacy.

Customer personality traits 118 comprise customer personality traits for one or more target customer segments that are based on, for example but without limitation, user input and/or analysis of customer-generated information 110 by personality trait inference component 112. Customer personality traits 118 can be, for example but without limitation, traits according to the Big Five model, a Needs model, and/or a Values model.

Personalization component 120 receives product personality traits 116 and customer personality traits 118, determines a degree of correlation between product personality traits 116 and customer personality traits 118, compares the degree of correlation to a threshold value, and, if the degree of correlation does not meet or exceed the threshold value, revises product personality traits 116 based on revising product information 106.

In an exemplary embodiment, personalization component 120 can determine a degree of correlation based on respective percentage scores of an Active trait in product personality traits 116 and an Active trait in customer personality traits 118. For example, personalization component 120 can compute the absolute difference in percentage scores between the corresponding traits, wherein a smaller absolute difference indicates a closer match. For example, if an Active trait in product personality traits 116 has a score of 90% (i.e., 0.90) and an Active trait in customer personality traits 118 has a score of 78% (i.e., 0.78), personalization component 120 can compute a difference of 0.12. In the same example, personalization component 120 can determine a differences in percentage scores for each pair of traits in personality traits 116 and customer personality traits 118.

The threshold value can be defined and/or revised based on a user input (e.g., human input, merchandizer input). In accordance with the afore-described example, the user can define a desired threshold value of 90% or 0.90, wherein the threshold value can be computed based on subtracting a difference in percentage scores from a perfect correlation (i.e., 1.0). In the same example, the computed difference of 12% can be subtracted from a perfect correlation, resulting in a value of 88% (computed as 1.0–0.12=0.88), which falls below the defined threshold value of 90%.

Figure 2:
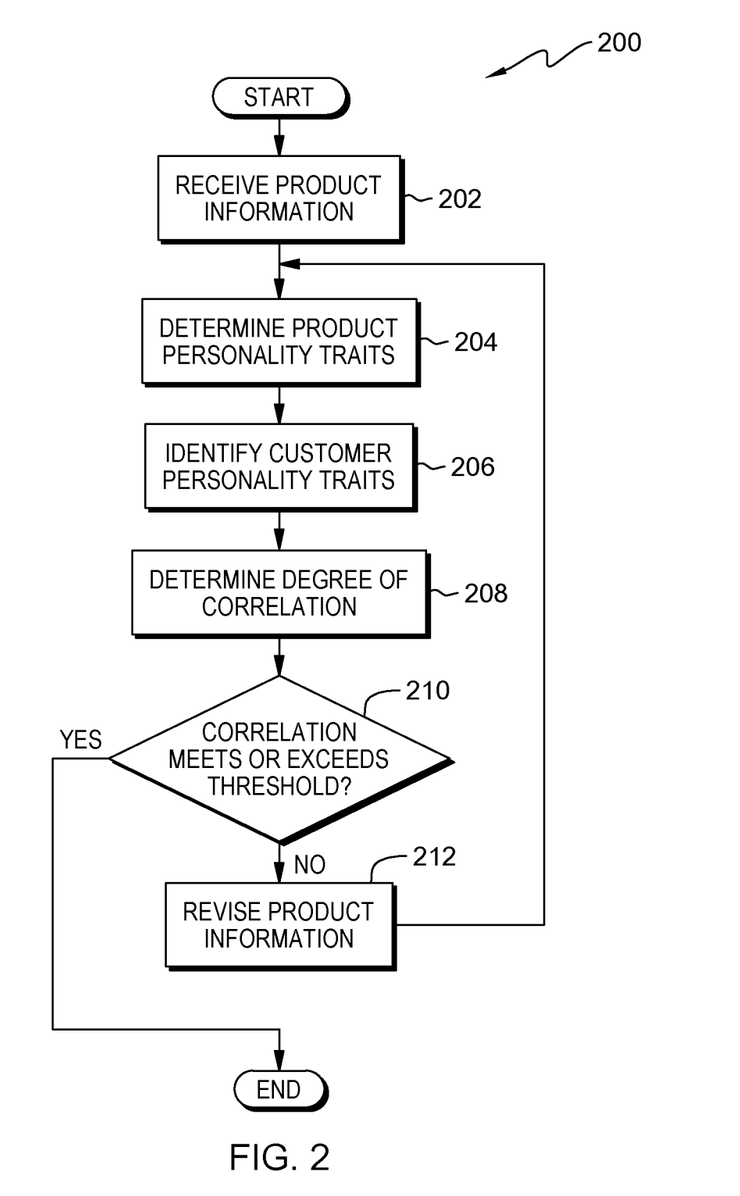
FIG. 2 is a flowchart depicting steps of a method for automated product personalization based on product personality, in accordance with an embodiment of the present invention.

Personalization component 120 continues to revise product personality traits 116 and evaluate the degree of correlation between product personality traits 116 and customer personality traits 118 until the threshold value is met or exceeded, as described herein with reference to FIG. 2. In an example, personalization component 120 can compute an initially large difference that decreases as personalization component 120 continues to revise product personality traits 116 and evaluate the degree of correlation.

Psycholinguistic dictionary 122 can be accessed by personality trait inference component 112 for the purpose of generating product personality traits 116, and by personalization component 120 for the purpose of revising managed information 108. Psycholinguistic dictionary 122 is a natural language (i.e., human-language) dictionary wherein one or more keywords are associated with one or more personality traits. A keyword can be, for example but without limitation, an adjective such as "sporty" or "quick." A personality trait can be, for example but without limitation, an Athletic trait. In an exemplary embodiment, the keywords "sporty" and "quick" can be associated with the Athletic trait in psycholinguistic dictionary 122.

In an exemplary embodiment, personalization component 120 can revise managed information 108 by replacing one or more keywords in a product description (e.g., managed information 108) based on psycholinguistic dictionary 122. Personalization component 120 can, for example but without limitation, replace one or more keywords in managed information 108 that is not associated with a desired trait in psycholinguistic dictionary 122 with one or more keywords in managed information 108 that is associated with a desired trait in psycholinguistic dictionary 122, as further described herein with reference to FIG. 3A.

Psycholinguistic dictionary 118 can be enriched based on personality trait inference component 112 extracting terms from customer-generated information 110. In an example, customer-generated information 110 includes the following product review for running shoes: "I love how flexible, breathable, and durable these shoes are! These are very comfortable!" In the same example, personality trait inference component 112 can extract the following adjectives from customer-generated information 110: "flexible," "breathable," "durable," and "comfortable." Personality trait inference component 112 can add the adjective "breathable" to psycholinguistic dictionary 122 based on determining that "breathable" is not yet associated with running shoes in psycholinguistic dictionary 122. For example, a search for the adjective "breathable" can return "fit or pleasant to breathe." A further search for "fit or pleasant to breathe" can return "Breathing Exercises." Based on the results, personality trait inference component 112 can determine a level of confidence for associating the adjective "breathable" with an Active trait and add "breathable" to psycholinguistic dictionary 122, if "breathable" is not yet associated with the Active trait. In an embodiment, analogous steps can be performed by a user (e.g., a catalog manager) to enrich psycholinguistic dictionary 122.

FIG. 2 is a flowchart 200 depicting operational steps of a method for automated product personalization based on product personality, in accordance with an embodiment of the present invention.

In step 202, personality trait inference component 112 receives product information 106 from one or more sources.

In step 204, personality trait inference component 112 determines one or more product personality traits 116 based on product information 106.

In step 206, personalization component 120 identifies one or more customer personality traits 118.

In step 208, personalization component 120 determines a degree of correlation between one or more traits from product personality traits 116 and one or more traits from customer personality traits 118.

In step 210, personalization component 120 determines whether the degree of correlation meets or exceeds, or does not meet or exceed, a threshold value.

If the degree of correlation does not meet or exceed the threshold value in step 210 (NO branch, step 210), then in step 212, personalization component 120 revises managed information 108 and repeats steps 204-210.

Figure 3A:
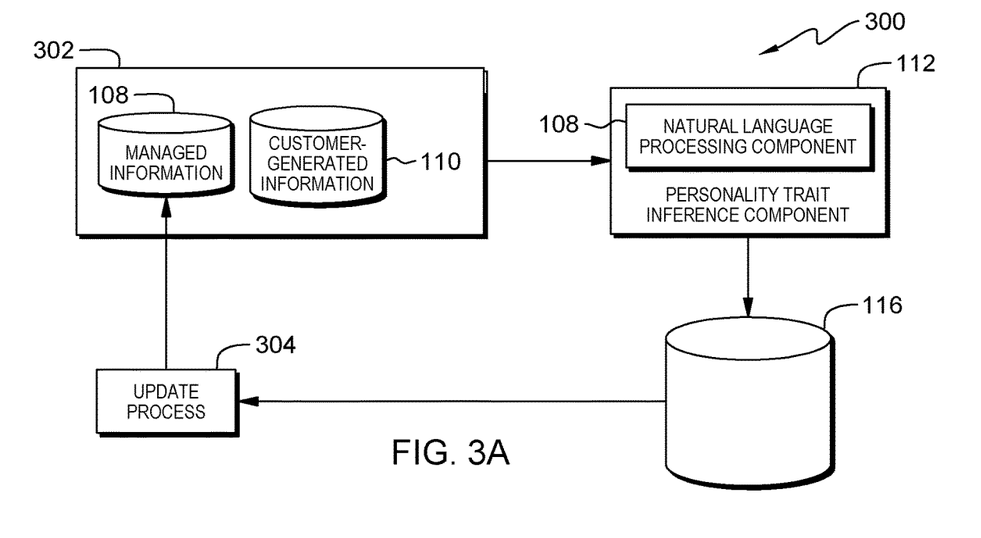
FIGS. 3A and 3B are implementation diagrams showing generation and revision of a product personality profile, in accordance with embodiments of present invention.
Figure 3B:
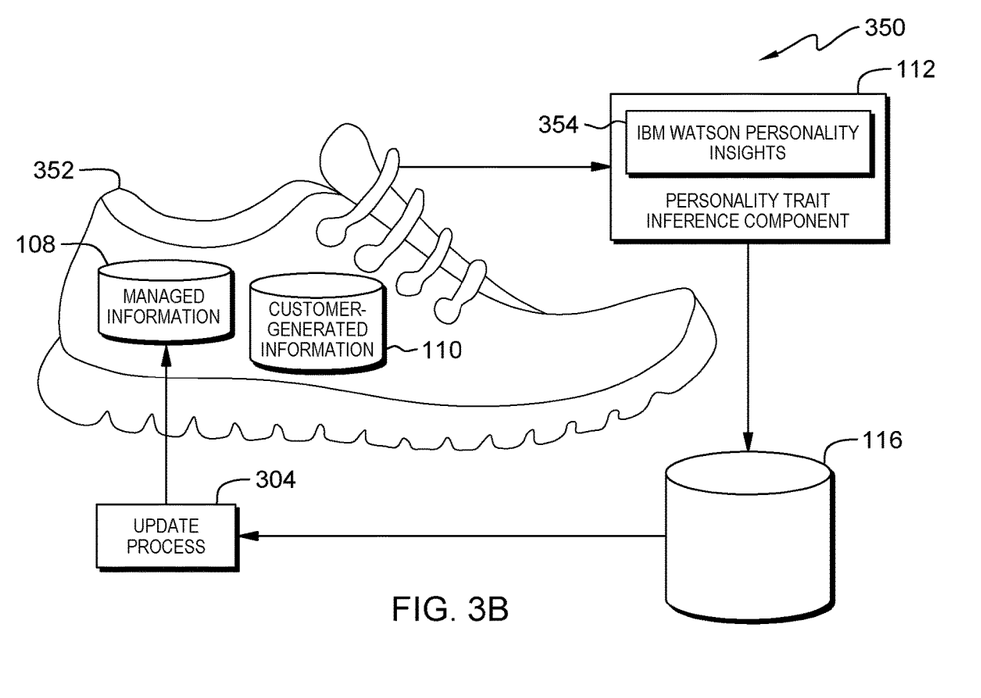

FIGS. 3A and 3B are implementation diagrams representing generation and revision of a product personality profile, in accordance with exemplary embodiments of the present invention.

FIG. 3A shows an example 300 of generation and revision of a product personality profile for product 302. Product information 106 (not illustrated) can be, for example but without limitation, managed information 108 comprising a product description, product attributes, product names, a catalog hierarchy, and category descriptions, and customer-generated information 110 comprising purchase history information, product reviews, and user surveys for product 302. Personality trait inference component 112 receives product information 106. Personality trait inference component 112 determines product personality traits 116 for product 302. In update process 304, responsive to a degree of correlation between product personality traits 116 and customer personality traits 118 (not illustrated) not meeting and not exceeding a threshold value, personalization component 120 (not illustrated) alters product information 106.

For example, product information 106 comprises a product description containing the keywords "comfortable" and "supportive." Based on product information 106, product personality traits 116 comprise a high percentage score in a Modest trait and a low percentage score in an Active trait. If in this example a merchandizer interacting with the system defines a target customer segment, represented by customer personality traits 118, that scores high in an Active trait (e.g., if the target customer segment comprises athletes or outdoorspeople), and the degree of correlation between product personality traits 116 and customer personality traits 118 does not meet or exceed a threshold value defined by the merchandizer, personalization component 120 alters managed information 108 in update process 304 to include the adjectives "performance-enhancing" and "dynamic" in order to increase the percentage score for the Active trait in product personality traits 116.

FIG. 3B shows an example 350 of generation and revision of a product personality profile for running shoes 352. Example 350 shows a more specific implementation of the components and steps illustrated in example 300, wherein personality trait inference component 112 is based on IBM Watson Personality Insights 354. Example 350 is intended to be non-limiting, and natural language processing component 114 can be a different NLP in another embodiment.

Figure 4:
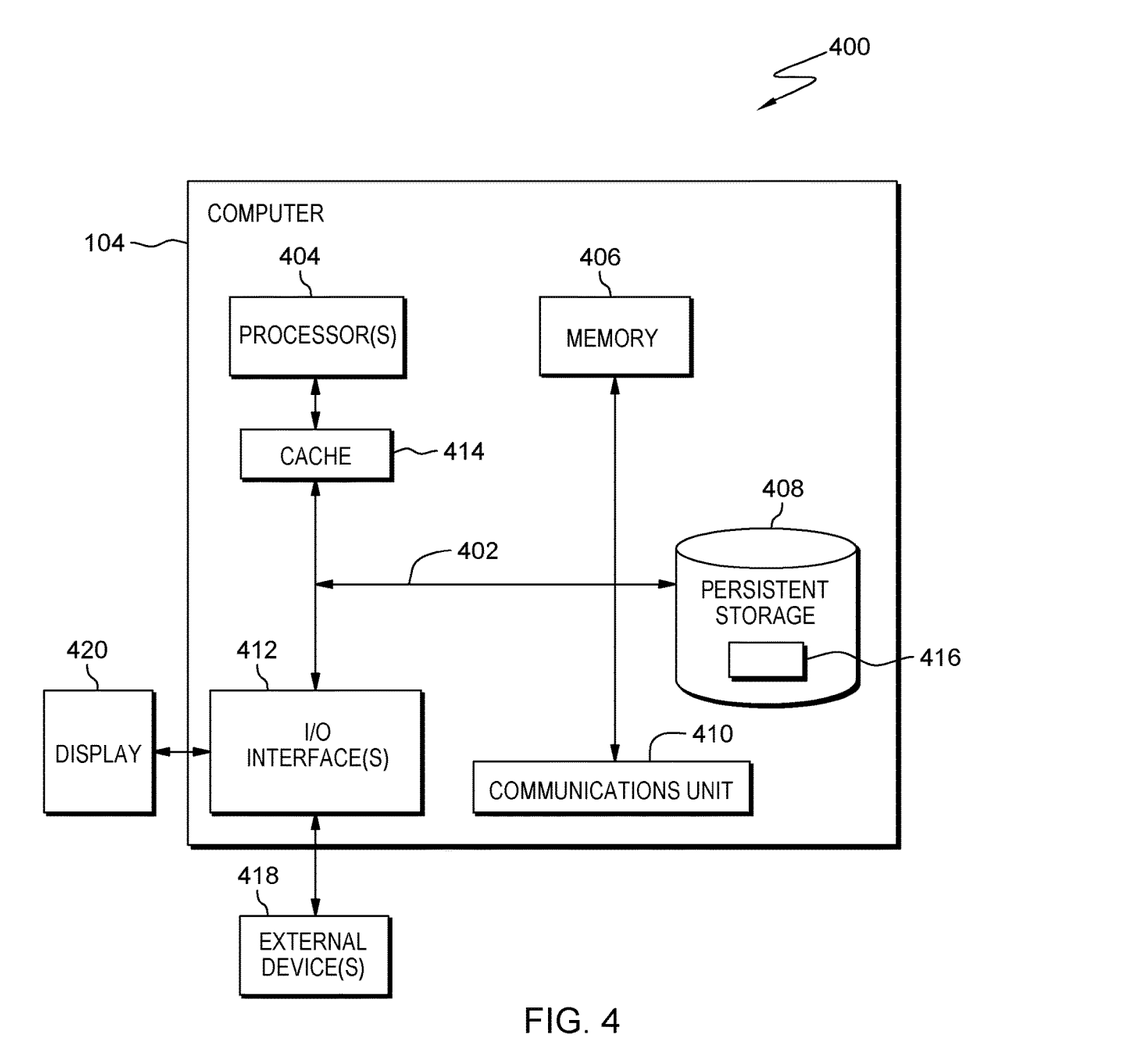
FIG. 4 is a block diagram of components of the computing device in FIG. 1 executing a program for automated product personalization based on product personality, in accordance with an embodiment of the present invention.

FIG. 4 depicts a block diagram 400 of components of a computer, such as computing device 104 in computing environment 100, in accordance with illustrative embodiments of the present invention. It should be appreciated that FIG. 4 provides only an illustration of one implementation and does not imply any limitations with regard to the environments in which different embodiments may be implemented. Many modifications to the depicted environment can be made.

Block diagram 400 shows communications fabric 402, which provides communications between computer processor(s) 404, memory 406, persistent storage 408, communications unit 410, and input/output (I/O) interface(s) 412, and cache 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) and cache memory 414. In general, memory 406 can include any suitable volatile or non-volatile computer readable storage media. Cache 414 is a fast memory that enhances the performance of computer processor(s) 404 by holding recently accessed data, and data near accessed data, from memory 406.

Program instructions and data used to practice embodiments of the invention, referred to collectively as component(s) 416, are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. Communications unit 410 can include one or more network interface cards. Communications unit 410 can provide communications through the use of either or both physical and wireless communications links. Component(s) 416 can be downloaded to persistent storage 408 through communications unit 410.

I/O interface(s) 412 allows for input and output of data with other devices that may be connected to computing device 104. For example, I/O interface 412 can provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., component(s) 416, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a touchscreen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for improving automated product personalization based on product personality through a natural language processor over a network, the method comprising:
    receiving, by the natural language processor, textual information related to a product, wherein the textual information comprises: an initial product description, purchase history information, a product review, a user survey, product attribute information, a product name, a catalog hierarchy, and a product category description;
    generating, by the natural language processor, a product personality profile by tokenizing the textual information by the natural language processor, wherein the product personality profile comprises a set of product personality traits;
    identifying, by one or more computer processors, a set of customer personality traits for a target customer group;
    determining, by the one or more computer processors, a degree of correlation between a first traits from the set of product personality traits and a second traits from the set of customer personality traits;
    determining, by the one or more computer processors, whether the degree of correlation meets or exceeds a predetermined threshold value;
    responsive to determining that the degree of correlation does not exceed the predetermined threshold value, revising, by the one or more computer processors, the textual information based on a computer-based psycholinguistic dictionary by replacing one or more keywords in a product description that is not associated with a desired trait with one or more other keywords that is associated with a desired trait from the computer-based psycholinguistic dictionary; and
    repeating, by the one or more computer processors, the revising of textual information based on the computer-based psycholinguistic dictionary until the degree of correlation meets or exceeds the predetermined threshold value wherein repeating the revising of textual information comprises:
        continually updating, by the one or more computer processors, the product personality profile with product personality traits to increase the degree of correlation between the set of product personality traits and the set of consumer personality traits; and
        determining by the one or more computer processors, that the degree of correlation exceeds the predetermined threshold value, wherein determining that the degree of correlation exceeds the predetermined threshold value increases product to customer matching based on natural language processing and repeatedly updating the product personality profile.

2. The computer-implemented method of claim 1, wherein the target customer group is defined based on a user input.

3. The computer-implemented method of claim 1, wherein the predetermined threshold value is based on a user input.

4. The computer-implemented method of claim 1, further comprising: determining, by the one or more computer processors, one or more replacement words in the computer-based psycholinguistic dictionary for one or more words in the textual information.

5. The computer-implemented method of claim 4, further comprising:
    generating, by the one or more computer processors, a revised set of product personality traits based on analyzing the revised textual information by a natural language processor;
    determining, by the one or more computer processors, a degree of correlation between a first trait from the set of revised product personality traits and a second trait from the set of customer personality traits; and
    determining, by the one or more computer processors, whether the degree of correlation meets or exceeds the predetermined threshold value.

6. The computer-implemented method of claim 1, further comprising:
    extracting, by the one or more computer processors, one or more words from the textual information;

determining, by the one or more computer processors, that the one or more words do not exist in the computer-based psycholinguistic dictionary; and adding, by the one or more computer processors, the one or more words to the computer-based psycholinguistic dictionary.

7. The computer-implemented method of claim 1 further comprising:

enriching, by the one or more computer processors, the computer-based psycholinguistic dictionary by extracting one or more keywords from customer-generated information about the product, wherein one or more keywords is one or more adjectives and enriching the computer-based psycholinguistic dictionary further comprises:

determining, by the one or more computer processors, the one or more adjectives is not yet associated with the product; determining a level of confidence for associating the one or more adjectives with the product based on a definition search using the network; and storing, by the one or more processors, the one or more adjectives in the computer-based psycholinguistic dictionary.

8. A computer program product for improving automated product personalization based on product personality through a natural language processor over a network, the computer program product comprising:

one or more computer readable storage media and program instructions stored on the one or more computer readable storage media, the program instructions comprising:

program instructions to receive, by the natural language processor, textual information related to a product, wherein the textual information comprises: an initial product description, purchase history information, a product review, a user survey, product attribute information, a product name, a catalog hierarchy, and a product category description;

program instructions to generate, by the natural language processor, a product personality profile by tokenizing the textual information by the natural language processor, wherein the product personality profile comprises a set of product personality traits;

program instructions to identify a set of customer personality traits for a target customer group;

program instructions to determine a degree of correlation between a first trait from the set of product personality traits and a second trait from the set of customer personality traits;

program instructions to determine whether the degree of correlation meets or exceeds a predetermined threshold value;

responsive to determining that the degree of correlation does not exceed the predetermined threshold value, program instructions to revise the textual information based on a computer-based psycholinguistic dictionary by replacing one or more keywords in a product description that is not associated with a desired trait with one or more other keywords that is associated with a desired trait from the computer-based psycholinguistic dictionary; and program instructions to repeat, the revising of textual information based on the computer-based psycholinguistic dictionary until the degree of correlation meets or exceeds the predetermined threshold value, wherein repeating the revising of textual information comprises:

program instructions to continually update the product personality profile with product personality traits to increase the degree of correlation between the set product personality traits and the set of consumer personality traits; and program instructions to determine that the degree of correlation exceeds the predetermined threshold value, wherein determining that the degree of correlation exceeds the predetermined threshold value increases product to customer matching based on natural language processing and repeatedly updating the product personality profile.

9. The computer program product of claim 8, wherein the target customer group is defined based on a user input.

10. The computer program product of claim 8, wherein the predetermined threshold value is based on a user input.

11. The computer program product of claim 8, further comprising:

program instructions to determine one or more replacement words in the computer-based psycholinguistic dictionary for one or more words in the textual information.

12. The computer program product of claim 11, further comprising:

program instructions to generate a revised set of product personality traits based on analyzing the revised textual information by a natural language processor;

program instructions to determine a degree of correlation between a first trait from the set of revised product personality traits and a second trait from the set of customer personality traits; and program instructions to determine whether the degree of correlation meets or exceeds the predetermined threshold value.

13. The computer program product of claim 8, further comprising:

program instructions to extract one or more words from the textual information;

program instructions to determine that the one or more words do not exist in the computer-based psycholinguistic dictionary; and program instructions to add the one or more words to the computer-based psycholinguistic dictionary.

14. The computer program product of claim 8 further comprising:

program instructions to enrich the computer-based psycholinguistic dictionary by extracting one or more keywords from customer-generated information about the product, wherein one or more keywords is one or more adjectives and enriching the computer-based psycholinguistic dictionary further comprises:

program instructions to determine the one or more adjectives is not yet associated with the product;

program instructions to determine a level of confidence for associating the one or more adjectives with the product based on a definition search using the network; and program instructions to store the one or more adjectives in the computer-based psycholinguistic dictionary.

15. A computer system for improving automated product personalization based on product personality through a natural language processor over a network, the computer program product comprising:

one or more computer readable storage media and program instructions stored on the one or more computer readable storage media, the program instructions comprising:
  program instructions to receive, by the natural language processor, textual information related to a product, wherein the textual information comprises: an initial product description, purchase history information, a product review, a user survey, product attribute information, a product name, a catalog hierarchy, and a product category description;
  program instructions to generate, by the natural language processor, a product personality profile by tokenizing the textual information by the natural language processor, wherein the product personality profile comprises a set of product personality traits;
  program instructions to identify a set of customer personality traits for a target customer group;
  program instructions to determine a degree of correlation between a first trait from the set of product personality traits and a second trait from the set of customer personality traits;
  program instructions to determine whether the degree of correlation meets or exceeds a predetermined threshold value;
  responsive to determining that the degree of correlation does not exceed the predetermined threshold value, program instructions to revise the textual information based on a computer-based psycholinguistic dictionary by replacing one or more keywords in a product description that is not associated with a desired trait with one or more other keywords that is associated with a desired trait from the computer-based psycholinguistic dictionary; and
  program instructions to repeat, the revising of textual information based on the computer-based psycholinguistic dictionary until the degree of correlation meets or exceeds the predetermined threshold value, wherein repeating the revising of textual information comprises:
    program instructions to continually update the product personality profile with product personality traits to increase the degree of correlation between the set product personality traits and the set of consumer personality traits; and
    program instructions to determine that the degree of correlation exceeds the predetermined threshold value, wherein determining that the degree of correlation exceeds the predetermined threshold value increases product to customer matching based on natural language processing and repeatedly updating the product personality profile.

16. The computer system of claim 15, wherein the target customer group is defined based on a user input.

17. The computer system of claim 15, wherein the predetermined threshold value is based on a user input.

18. The computer system of claim 15, further comprising:
  program instructions to determine one or more replacement words in the computer-based psycholinguistic dictionary for one or more words in the textual information.

19. The computer system of claim 18, further comprising:
  program instructions to generate a revised set of product personality traits based on analyzing the revised textual information by a natural language processor;
  program instructions to determine a degree of correlation between a first trait from the set of revised product personality traits and a second trait from the set of customer personality traits; and
  program instructions to determine whether the degree of correlation meets or exceeds the predetermined threshold value.

20. The computer system of claim 15 further comprising:
  program instructions to enrich the computer-based psycholinguistic dictionary by extracting one or more keywords from customer-generated information about the product, wherein one or more keywords is one or more adjectives and enriching the computer-based psycholinguistic dictionary further comprises:
    program instructions to determine the one or more adjectives is not yet associated with the product;
    program instructions to determine a level of confidence for associating the one or more adjectives with the product based on a definition search using the network; and
    program instructions to store the one or more adjectives in the computer-based psycholinguistic dictionary.

* * * * *